United States Patent
Kim et al.

(10) Patent No.: US 11,946,642 B2
(45) Date of Patent: *Apr. 2, 2024

(54) WASTE WATER INCINERATION METHOD AND APPARATUS FOR THE SAME

(71) Applicant: LG CHEM, LTD., Seoul (KR)

(72) Inventors: Tae Woo Kim, Daejeon (KR); Sung Kyu Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 890 days.

This patent is subject to a terminal disclaimer.

(21) Appl. No.: 16/970,415

(22) PCT Filed: Dec. 23, 2019

(86) PCT No.: PCT/KR2019/018280
§ 371 (c)(1),
(2) Date: Aug. 17, 2020

(87) PCT Pub. No.: WO2020/241998
PCT Pub. Date: Dec. 3, 2020

(65) Prior Publication Data
US 2023/0115643 A1    Apr. 13, 2023

(30) Foreign Application Priority Data

May 28, 2019 (KR) .......................... 10-2019-0062733

(51) Int. Cl.
*C02F 1/04* (2023.01)
*C02F 1/74* (2023.01)
*F23G 7/00* (2006.01)

(52) U.S. Cl.
CPC .............. *F23G 7/008* (2013.01); *C02F 1/043* (2013.01); *C02F 1/048* (2013.01); *C02F 1/74* (2013.01);
(Continued)

(58) Field of Classification Search
CPC .. C02F 1/043; C02F 1/048; C02F 1/74; F23G 7/008; F23G 2200/00; F23G 2209/10
See application file for complete search history.

(56) References Cited

U.S. PATENT DOCUMENTS 4,232,614 A * 11/1980 Fitch ....................... F23G 7/001
                                                        110/238
4,714,032 A * 12/1987 Dickinson ................ F23K 1/00
                                                        110/238
(Continued)

FOREIGN PATENT DOCUMENTS

CN    104359113 A    2/2015
CN    108558101 A    9/2018
(Continued)

OTHER PUBLICATIONS

KR 101773080 ESPACENET Translation obtained Sep. 12, 2023. (Year: 2023).*

*Primary Examiner* — Jonathan Miller
(74) *Attorney, Agent, or Firm* — Bryan Cave Leighton Paisner LLP

(57) ABSTRACT

Provided is a waste water incineration method including (S10) supplying waste water to an evaporator to evaporate the waste water, (S20) supplying an evaporator top discharge stream discharged from the evaporator to an incinerator to incinerate the discharge stream, (S30) mixing a first incinerator discharge stream and a second incinerator discharge stream discharged from the incinerator to form a mixed discharge stream, and (S40) heat-exchanging the mixed discharge stream and a fresh air stream in a first heat exchanger, wherein the mixed discharge stream which has passed through the first heat exchanger is heat-exchanged in a second heat exchanger and discharged to the atmosphere.

11 Claims, 2 Drawing Sheets

(52) U.S. Cl.
CPC ...... *F23G 2200/00* (2013.01); *F23G 2209/10* (2013.01)

(56) References Cited

U.S. PATENT DOCUMENTS

| | | | | |
|---|---|---|---|---|
| 4,838,184 | A * | 6/1989 | Young | F23G 7/14 |
| | | | | 405/129.27 |
| 5,000,099 | A * | 3/1991 | Dickinson | C02F 11/086 |
| | | | | 110/238 |
| 5,601,040 | A * | 2/1997 | McGill | F23G 7/06 |
| | | | | 110/238 |
| 6,125,633 | A * | 10/2000 | Strohmeyer, Jr. | F23G 7/001 |
| | | | | 60/671 |
| 6,397,766 | B1 * | 6/2002 | Oh | F23G 5/006 |
| | | | | 110/238 |
| 6,435,860 | B1 * | 8/2002 | Brookshire | F23D 11/383 |
| | | | | 431/185 |

FOREIGN PATENT DOCUMENTS

| | | |
|---|---|---|
| CN | 109442438 A | 3/2019 |
| EP | 0671587 A1 | 9/1995 |
| JP | H07280241 A | 10/1995 |
| JP | 2002-523718 A | 7/2002 |
| JP | 5027697 B2 | 9/2012 |
| JP | 6086944 B2 | 3/2017 |
| KR | 10-1998-0082082 A | 11/1998 |
| KR | 10-0334692 B1 | 5/2002 |
| KR | 10-2011-0031813 A | 9/2009 |
| KR | 10-2010-0067967 A | 6/2010 |
| KR | 10-2010-0113947 A | 10/2010 |
| KR | 2011-0031813 A | 3/2011 |
| KR | 10-1030918 B1 | 4/2011 |
| KR | 10-2015-0036866 A | 4/2015 |
| KR | 10-2016-0117674 A | 10/2016 |
| KR | 10-2017-0004799 A | 1/2017 |
| KR | 101773080 B1 | 9/2017 |
| KR | 10-2018-0133127 A | 12/2018 |

* cited by examiner

WASTE WATER INCINERATION METHOD AND APPARATUS FOR THE SAME

CROSS-REFERENCE TO RELATED APPLICATIONS

This application claims benefit of priority of Korean Patent Application No. 10-2019-0062733 filed on May 28, 2019, the disclosure of which is incorporated herein by reference in its entirety.

TECHNICAL FIELD

The present invention relates to a waste water incineration method and a waste water incineration apparatus, and more particularly, to an energy-saving waste water incineration method and waste water incineration apparatus for recycling waste heat generated when waste water is incinerated.

BACKGROUND ART

Volatile organic compounds, which collectively refer to hydrocarbon compounds, are severely malodorous substances generated during painting work in chemical plants, waste water treatment plants, automobile factories, and the like, harmful substances exhibiting carcinogenic properties, as well as photochemical smog-causing substances such as ozone, and substances causing global warming and stratospheric ozone depletion that affects the atmosphere in a variety of forms, including adverse environmental and health effects. Therefore, discharge of waste water containing the volatile organic compounds to the outside as is brings about severe environmental contamination, and thus, the waste water must be discharged after pollutants therein are treated first.

Currently known techniques for treating volatile organic compounds in waste water include incineration, adsorption removal, absorption, cooling condensation, biological treatment, membrane technology, and the like, among which a regenerative thermal oxidizer (RTO) is widely used.

The RTO (i.e., furnace or incinerator) is a facility which incinerates a waste gas containing volatile organic compounds and recovers heat generated during incineration through a ceramic filler which has a larger surface area and which is semi-permanently used to significantly reduce an operation cost of the incinerator, instead of using an existing direct flame type indirect heat-exchange regenerative thermal oxidizer (general incinerator method), which incurs low cost for an incinerator operation and minimizes an installation area. Further, treatment efficiency of the RTO is as high as 99% or more and a secondary pollution factor is small.

However, in incinerating waste water containing volatile organic compounds using the RTO, since waste water is directly injected to the furnace, an excessive amount of heat (energy) must be supplied to the furnace, and since a heat recovery design is not advanced, a temperature of the stream discharged to the atmosphere is very high, resulting in an increase in waste of energy.

Therefore, in order to solve the problems of the related art, a design for saving energy in waste water incineration is required.

DISCLOSURE

Technical Problem

An object of the present invention is to provide an energy saving waste water incineration method and apparatus to solve the problems mentioned in the background art of the invention.

In other words, the present invention has an object of providing a waste water incineration method and apparatus for saving energy required for incinerating waste water and lowering a temperature of a stream discharged to the atmosphere by recycling, through heat exchange, waste heat generated when waste water is incinerated.

Technical Solution

In one general aspect, a waste water incineration method includes: (S10) supplying waste water to an evaporator to evaporate the waste water; (S20) supplying an evaporator top discharge stream discharged from the evaporator to an incinerator to incinerate the discharge stream; (S30) mixing a first incinerator discharge stream and a second incinerator discharge stream discharged from the incinerator to form a mixed discharge stream; and (S40) heat-exchanging the mixed discharge stream and a fresh air stream in a first heat exchanger, wherein the mixed discharge stream passing through the first heat exchanger is heat-exchanged in a second heat exchanger and discharged to the atmosphere.

In another general aspect, a waste water incineration apparatus includes: an evaporator evaporating supplied waste water and supplying an evaporated top discharge stream to an incinerator; the incinerator receiving the top discharge stream supplied from the evaporator and incinerating the evaporator top discharge stream to supply a first incinerator discharge stream and a second incinerator discharge stream to a third mixer; the third mixer receiving the first incinerator discharge stream and the second incinerator discharge stream supplied from the incinerator and supplying a mixed discharge stream of the first incinerator discharge stream and the second incinerator discharge stream to a first heat exchanger; the first heat exchanger heat-exchanging the mixed discharge stream supplied from the third mixer with a supplied fresh air stream; and a second heat exchanger heat-exchanging the supplied mixed discharge stream which has passed through the first heat exchanger and discharging the heat-exchanged mixed discharge stream to the atmosphere.

Advantageous Effects

According to the waste water incineration method and waste water incineration apparatus of the present invention, the use of fuel required for heating waste water in an evaporator may be reduced by heating a stream supplied to the evaporator through heat exchange by recovering waste heat generated during incineration of waste water.

In addition, according to the waste water incineration method and waste water incineration apparatus of the present invention, a temperature of a steam discharged to the atmosphere may be lowered by recovering waste heat generated during incineration of waste water and recycling the recovered waste heat through heat exchange.

BEST MODE

Figure 1:
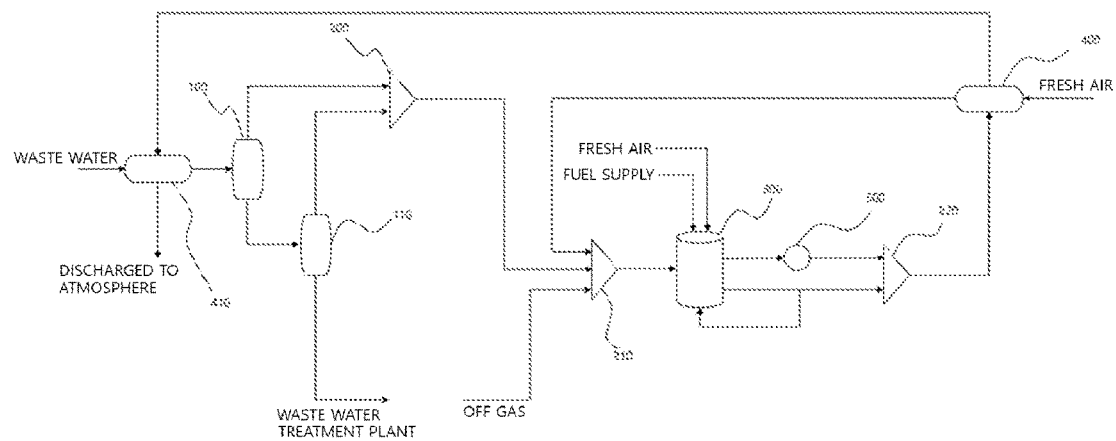
FIGS. 1 and 2 show a process flow diagram of a waste water incineration method according to an embodiment of the present invention.

Terms and words used in the present specification and claims are not to be construed as a general or dictionary meaning but are to be construed as meaning and concepts meeting the technical ideas of the present invention based on a principle that the inventors may appropriately define the concepts of terms in order to describe their own inventions in the best mode.

In the present invention, the term "stream" may refer to a flow of fluid in a process or may refer to a fluid itself flowing in a pipe. Specifically, the 'stream' may refer to both the fluid itself and a flow of the fluid flowing in a pipe connecting each device. In addition, the fluid may refer to a gas or a liquid.

Hereinafter, the present invention will be described in more detail to help understand the present invention.

According to the present invention, a waste water incineration method is provided. The waste water incineration method includes: (S10) supplying waste water to an evaporator to evaporate the waste water; (S20) supplying an evaporator top discharge stream discharged from the evaporator to an incinerator to incinerate the discharge stream; (S30) mixing a first incinerator discharge stream and a second incinerator discharge stream discharged from the incinerator to form a mixed discharge stream; and (S40) heat-exchanging the mixed discharge stream and a fresh air stream in a first heat exchanger, wherein the mixed discharge stream which has passed through the first heat exchanger is heat-exchanged in a second heat exchanger and then discharged to the atmosphere.

In modern society with consumer life and industrial activities, various wastes continue to be discharged as byproducts of material civilization activities, and among the wastes, waste water is a waste discharged in a liquid form according to an embodiment of the present invention. Specifically, waste water is classified as household waste water and factory waste water according to sources thereof. Household waste water may refer to waste water discharged from each household and public buildings and business buildings that discharge waste substances similarly to households, and factory waste water may refer to waste water discharged from each factory, which may be referred to as industrial waste water in a broad sense and may collectively refer to waste water discharged from all industrial facilities.

According to an embodiment of the present invention, the waste water may be a liquid factory waste water containing various chemicals used in industrial production processes. For example, the waste water may be composed of organic substances including water, methanol, butanol, neopentyl glycol, sodium chloride, butyl aldehyde, octanol, trimethylamine, and the like.

According to an embodiment of the present invention, in the step (S10) of supplying waste water to an evaporator to evaporate the waste water, for example, while waste water is being supplied to the evaporator and heated to be evaporated, the waste water may be separated into a top discharge stream including water vapor, organic matter, and a plastic substance, and a bottom discharge stream including sludge. Here, the bottom discharge stream may be moved directly to a waste water treatment plant.

According to an embodiment of the present invention, the step (S10) of supplying the waste water to the evaporator to evaporate the waste water may be performed a plurality of times to more effectively separate the top discharge stream and the bottom discharge stream. For example, while the waste water is being supplied to a first evaporator 100 and heated so as to be evaporated, the waste water may be separated into a first evaporator 100 top discharge stream and the first evaporator 100 bottom discharge stream. Thereafter, the first evaporator 100 bottom discharge stream is secondly evaporated using a second evaporator 110 so as to be separated into the second evaporator 110 top discharge stream and a second evaporator 110 bottom discharge stream. Here, the second evaporator 110 top discharge stream may be mixed with the first evaporator 100 top discharge stream in a first mixer 200 and discharged, and the second evaporator 110 bottom discharge stream may be moved to the waste water treatment plant.

According to an embodiment of the present invention, step (S20) of supplying the evaporator top discharge stream discharged from the evaporator to an incinerator 300 and incinerating the same may be performed through a regenerative thermal oxidizer (RTO), and the evaporator top discharge stream may be supplied to the incinerator 300 and undergo a preheating step and an incineration step. Here, the evaporator top discharge stream may be a stream discharged after the first evaporator 100 top discharge stream and the second evaporator 110 top discharge stream are mixed in the first mixer 200.

According to an embodiment of the invention, the evaporator top discharge stream may be increased in temperature to 100° C. or higher during the evaporation process. In this case, the evaporator top discharge stream itself having the temperature of 100° C. or higher may be supplied to the incinerator 300 and utilized as fuel.

The evaporator top discharge stream may first come into direct contact with a ceramic medium heat-stored in a heat storage layer so as to be preheated and enter the incinerator (i.e., RTO) 300. Here, a preheating temperature may differ depending on a heat storage efficiency design of the incinerator 300, but the evaporator top discharge stream may be combined with heat of combustion generated while being burned by itself so as to be preheated up to a temperature of 800° C. or higher, which is almost a temperature of the incinerator 300. After the preheated stream is completely incinerated in the incinerator 300, it provides heat to the ceramic medium to heat the ceramic medium, while passing through another heat storage layer, and the incinerator 300 discharge stream may be partially cooled.

According to an embodiment of the invention, a mixed discharge stream of the first incinerator discharge stream and the second incinerator discharge stream discharged from the incinerator 300 may be heat-exchanged with a fresh air stream in the step S40. Specifically, the mixed discharge stream may be supplied to the first heat exchanger 400 and transfer heat to the fresh air stream supplied to the first heat exchanger 400.

The fresh air stream passing through the first heat exchanger 400 may be mixed with the evaporator top discharge stream and supplied to the incinerator 300. Specifically, the fresh air stream heat-exchanged in the first heat exchanger 400 may be mixed with the evaporator top discharge stream in the second mixer 210 and supplied to the incinerator 300. In addition, the mixed discharge stream which has passed through the first heat exchanger 400 may be supplied to the second heat exchanger 410 to be heat-exchanged and then discharged to the atmosphere.

In addition, according to an embodiment of the present invention, the waste water may be heat-exchanged with the mixed discharge stream which has passed through the first heat exchanger 400 in the second heat exchanger 410 and then supplied to the evaporator. The heat exchange in the first heat exchanger 400 and the second heat exchanger 410 may be performed by a counter-current flow, a co-current flow, or a cross flow of two different streams. For example, in the first heat exchanger 400, the mixed discharge stream may be supplied to the second heat exchanger 410, while transferring heat to the fresh air stream, transfer heat to the waste water in the second heat exchanger 410, and then be discharged to the atmosphere. Accordingly, heat may be effectively recycled in the waste water incineration process and a temperature of the stream discharged to the atmosphere may be lowered.

In addition, the fresh air stream obtains heat from the mixed discharge stream so as to be increased in temperature, and the heat may be supplied to the incinerator 300 to replace part of the energy required in the incinerator. In addition, the waste water, in a sufficiently heated state by obtaining heat from the mixed discharge stream passing through the first heat exchanger 400, may be supplied to the evaporator, thereby saving energy required to heat the waste water in the evaporator.

According to an embodiment of the present invention, a temperature of the waste water passing through the second heat exchanger 410 may be higher than a temperature of the waste water before passing through the second heat exchanger 410. Specifically, as described above, the waste water is heat-exchanged with the mixed discharge stream, which has passed through the first heat exchanger 400, in the second heat exchanger 410. Here, as the waste water receives heat from the mixed discharge stream passing through the first heat exchanger 400, the temperature of the waste water may be increased, while passing through the second heat exchanger 410. For example, the temperature of the waste water passing through the second heat exchanger 410 may be 50° C. to 130° C., 55° C. to 120° C., or 60° C. to 110° C. Thus, it can be seen that the temperature of the waste water is significantly higher than 20° C. to 40° C. which is the temperature of the waste water before passing through the second heat exchanger 410.

Further, according to an embodiment of the present invention, the temperature of the first incinerator discharge stream may be higher than the temperature of the second incinerator discharge stream. For example, the temperature of the first incinerator discharge stream may be 400° C. to 500° C., 420° C. to 480° C., or 440° C. to 460° C., and the temperature of the second incinerator discharge stream may be 100° C. to 250° C., 130° C. to 220° C., or 170° C. to 190° C. As such, since energy is recycled by dividing the stream discharged from the incinerator 300 into the first incinerator discharge stream having a relatively high temperature and the second incinerator discharge stream having a low temperature, energy may be saved more effectively.

In addition, according to an embodiment of the present invention, the first incinerator discharge stream discharged from the incinerator 300 may be a stream passing through a steam generator 500. Specifically, the first incinerator discharge stream discharged from the incinerator 300 may be discharged at a high temperature of 800° C. to 1,000° C. when discharged from the incinerator 300, and here, the first incinerator discharge stream having the high temperature may be lowered in temperature to 400° C. to 500° C., while passing through the steam generator 500, and in this process, thermal energy may be recycled during the formation of steam. While the first incinerator discharge stream passes through the steam generator 500, steam formed from waste heat of the first incinerator discharge stream may be stored and used as a heat source in various processes.

In addition, according to an embodiment of the present invention, the first incinerator discharge stream may be heat-exchanged with the fresh air stream passing through the first heat exchanger 400 in the third heat exchanger 420. The first incinerator discharge stream and the fresh air stream passing through the first heat exchanger 400 may be heat-exchanged with each other by a counter-current flow, a co-current flow, or a cross flow in the third heat exchanger 420. Specifically, the first incinerator discharge stream may be heat-exchanged with the fresh air stream, which has passed through the first heat exchanger 400, in the third heat exchanger 420, thereby providing heat to the fresh air stream so as to be recycled as a heat source of waste water incineration. At the same time, the first incinerator discharge stream heat-exchanged in the third heat exchanger 420 may be mixed with the second incinerator discharge stream at a lower temperature to form a mixed discharge stream, and the mixed discharge stream may be heat-exchanged with a fresh air stream in the first heat exchanger 400 so as to be discharged to the atmosphere at an even lower temperature.

Further, according to an embodiment of the present invention, the temperature of the first incinerator discharge stream passing through the third heat exchanger 420 may be lower than the temperature of the first incinerator discharge stream before passing through the third heat exchanger 420. Specifically, as described above, the first incinerator discharge stream is heat-exchanged with the fresh air stream, which has passed through the first heat exchanger 400, in the third heat exchanger 420. Here, the first incinerator discharge stream provides heat to the fresh air stream, and thus, the temperature of the first incinerator discharge stream after passing through the third heat exchanger 420 is lowered. For example, the temperature of the first incinerator discharge stream passing through the third heat exchanger 420 may be 250° C. to 350° C., 270° C. to 330° C. or 280° C. to 300° C. It can be seen that the temperature of the first incinerator discharge stream is lower as compared to the temperature of 400° C. to 500° C. before passing through the third heat exchanger 420 of the first incinerator discharge stream.

In addition, according to an embodiment of the present invention, the fresh air stream passing through the first heat exchanger 400 may be supplied to the incinerator 300 through the third heat exchanger 420, and the temperature of the fresh air stream passing through the third heat exchanger 420 may be higher than that of the fresh air stream before passing through the third heat exchanger 420. Specifically, the temperature of the fresh air stream before passing through the third heat exchanger 420 may be 180° C. to 230° C., 190° C. to 220° C., or 200° C. to 210° C. In addition, the temperature of the fresh air stream after passing through the third heat exchanger 420 may be 250° C. to 350° C., 260° C. to 320° C. or 270° C. to 300° C. Specifically, the fresh air stream obtains heat from the stream discharged from the incinerator 300 by heat exchange through the first heat exchanger 400 and the third heat exchanger 420, thus being supplied in a high temperature state to the incinerator 300. In this case, energy required for heating the air in the incinerator 300 may be saved as compared with the case where the air is supplied to the incinerator 300 at room temperature.

In addition, according to an embodiment of the present invention, the mixed discharge stream passing through the first heat exchanger 400 may be heat-exchanged with the waste water in the second heat exchanger 410 and subsequently discharged to the atmosphere, and a temperature of the stream discharged to the atmosphere may be 125° C. or less. For example, the temperature of the stream discharged to the atmosphere in the waste water incineration process may be 50° C. to 120° C., 60° C. to 110° C., or 65° C. to 110° C. This is a significantly lower temperature compared to the temperature of the stream discharged to the atmosphere during the incineration of waste water using the existing RTO. Through this, the waste water incineration method according to the present invention solves the problem that white smoke occurs when a high temperature stream is discharged to the atmosphere in the existing waste water incineration process, and recycles a large amount of heat in the waste water incineration process, and saves a large amount of energy accordingly. Specifically, in the waste water incineration method according to the present invention, heat of the first incinerator discharge stream having a high temperature is primarily recycled to form steam in the steam generator 500, heat-exchanged with the fresh air stream in the first heat exchanger 400 so as to be secondarily recycled, and heat-exchanged with the waste water in the second heat exchanger 410 so as to be tertiarily recycled, thereby effectively saving energy.

In addition, according to an embodiment of the present invention, in the step (S10) of supplying the waste water to the evaporator to evaporate the waste water, if necessary, fuel may be introduced to obtain energy required for heating the waste water. For example, the amount of heat (energy) required in the step of supplying the waste water to the evaporator to evaporate the waste water may be 5.0 Gcal/hr or less. For example, the amount of heat required in the evaporator may be 0 Gcal/hr to 5.0 Gcal/hr, 2 Gcal/hr to 5.0 Gcal/hr or 4 Gcal/hr to 4.8 Gcal/hr.

In addition, according to an embodiment of the present invention, a portion of the second incinerator discharge stream discharged from the incinerator 300 may be returned to the incinerator 300 and recycled to preheat and heat the incinerator 300.

In addition, according to an embodiment of the present invention, air may be further supplied to further facilitate the incineration of waste water in the incinerator 300.

In addition, according to an embodiment of the present invention, a bottom discharge stream of the evaporator may be moved to a waste water treatment plant and an off gas that occurs in the waste water treatment plant may be supplied to the incinerator 300. Through this, the waste water incineration method according to the present invention may simultaneously incinerate both the waste water and the off gas that occurs in the waste water treatment plant.

According to the present invention, a waste water incineration apparatus is provided. The waste water incineration apparatus includes an evaporator evaporating supplied waste water and supplying an evaporated top discharge stream to an incinerator, an incinerator receiving the top discharge stream supplied from the evaporator and incinerating the evaporator top discharge stream to supply a first incinerator discharge stream and a second incinerator discharge stream to a third mixer, the third mixer receiving the first incinerator discharge stream and the second incinerator discharge stream supplied from the incinerator and supplying a mixed discharge stream of the first incinerator discharge stream and the second incinerator discharge stream to a first heat exchanger, the first heat exchanger heat-exchanging the mixed discharge stream supplied from the third mixer with a supplied air stream, and a second heat exchanger heat-exchanging the supplied mixed discharge stream which has passed through the first heat exchanger and discharging the heat-exchanged mixed discharge stream to the atmosphere.

According to an embodiment of the present invention, the waste water incineration apparatus may further include a third heat exchanger 420 heat-exchanging a first incinerator discharge stream discharged from the incinerator 300 and supplying the heat-exchanged first incinerator discharge stream to a third mixer 220.

According to an embodiment of the present invention, the waste water incineration apparatus according to the present invention may be an apparatus for performing a process according to the waste water incineration method described above.

According to an embodiment of the present invention, the waste water incineration apparatus according to the present invention may be described with reference to FIGS. 1 and 2 hereinafter. For example, the waste water incineration apparatus may include the first evaporator 100 primarily evaporating supplied waste water to separate the waste water into a top discharge stream including water vapor, organic matter, plastic substance, and the like and a bottom discharge stream including sludge. In addition, the bottom discharge stream discharged from the first evaporator 100 may be secondly evaporated using the second evaporator 110 so as to be separated into a top discharge stream and a bottom discharge stream. Here, the bottom discharge stream discharged from the second evaporator 110 moves to the waste water treatment plant, and the top discharge stream discharged from the second evaporator 110 may be mixed with the top discharge stream discharged from the first evaporator 100 in the first mixer 200 and discharged.

The stream discharged from the first mixer 200 may be supplied to the second mixer 210 and mixed with the off gas that occurs in the waste water treatment plant and a fresh air stream in the second mixer 210. Here, the fresh air stream may have been heat-exchanged, while passing through the first heat exchanger 400 or the first heat exchanger 400 and the third heat exchanger 420, and the waste water may have been heat-exchanged through the second heat exchanger 410, before being supplied to the first evaporator 100. For example, the waste water may have been heat-exchanged with the mixed discharge stream which has passed through the first heat exchanger 400 in the second heat exchanger 410.

The mixed stream discharged from the second mixer 210 may move to the incinerator 300. Additional fuel or air may be selectively introduced to the incinerator 300.

The incinerator 300 may incinerate the mixed stream discharged from the second mixer 210 and separately discharge the first incinerator discharge stream and the second incinerator discharge stream according to temperatures. The first incinerator discharge stream and the second incinerator discharge stream may be mixed in the third mixer 220. Here, the first incinerator discharge stream may be heat-exchanged in the third heat exchanger 420 and then mixed with the second incinerator discharge stream in the third mixer 220.

Before being supplied to the third mixer 220, the first incinerator discharge stream may form steam, while passing through the steam generator 500, and then be supplied to the third mixer 220. The mixed discharge stream mixed in the third mixer 220 may be supplied to the first heat exchanger 400, heat-exchanged with a fresh air stream in the first heat exchanger 400, and then supplied to the second heat exchanger 410, and the mixed discharge stream heat-exchanged in the second heat exchanger 410 may be discharged to the atmosphere.

The fresh air stream heat-exchanged in the first heat exchanger 400 or in the first heat exchanger 400 and the third heat exchanger 420 may be supplied to the incinerator 300. For example, the heat-exchanged fresh air stream may be supplied to the second mixer 210, mixed with the evaporator top discharge stream discharged from the first mixer 200 and the off gas discharged from the waste water treatment plant, and then supplied to the incinerator 300.

As described above, the waste water incineration method and apparatus according to the present invention have been described and illustrated in the drawings, but only the essential components for understanding the present invention have been described and illustrated, and in addition to the process and the devices described and illustrated above, a process and a device not separately described and illustrated may be appropriately applied and used to implement the waste water incineration method and apparatus according to the present invention.

Hereinafter, the present invention will be described in more detail with reference to examples. However, the following examples are intended to illustrate the present invention and it is apparent to those skilled in the art that various changes and modifications may be made within the scope and spirit of the present invention, and the scope of the present invention is not limited thereto.

EXAMPLE

Example 1

Regarding the process flow diagram shown in FIG. 1, a process was simulated using the Aspen Plus Simulator of Aspen Technology, Inc.

Here, a temperature of waste water supplied to the first evaporator was set to 30° C., a pressure thereof was set to 0.2 kg/sqcmg, and a mass flow rate was set to 10,000 kg/hr. Components of the waste water included 87.57 wt % of water, 4.90 wt % of methanol, 2.33 wt % of butanol, 1.65 wt % of neopentyl glycol (NPG), 2.91 wt % of sodium chloride, and other quantities of butyl aldehyde, octanol, trimethylamine, and the like.

In addition, a fresh air stream supplied to an incinerator was set at 20° C., a composition was set to 21 mol % of oxygen in molar ratio and 79 mol % of nitrogen in molar ratio, and components of the waste water included 87.57 wt % of water, 4.90% wt % of methanol, 2.33% wt % of butanol, 1.65 wt % of neopentyl glycol (NPG), 2.91 wt % of sodium chloride, and 0.64% wt % of organic substances including butyl aldehyde, octanol, trimethylamine, and the like.

In addition, the fresh air stream supplied to the incinerator was set to 20° C. and the composition was set to 21 mol % of oxygen and 79 mol % of nitrogen.

Example 2

Figure 2:
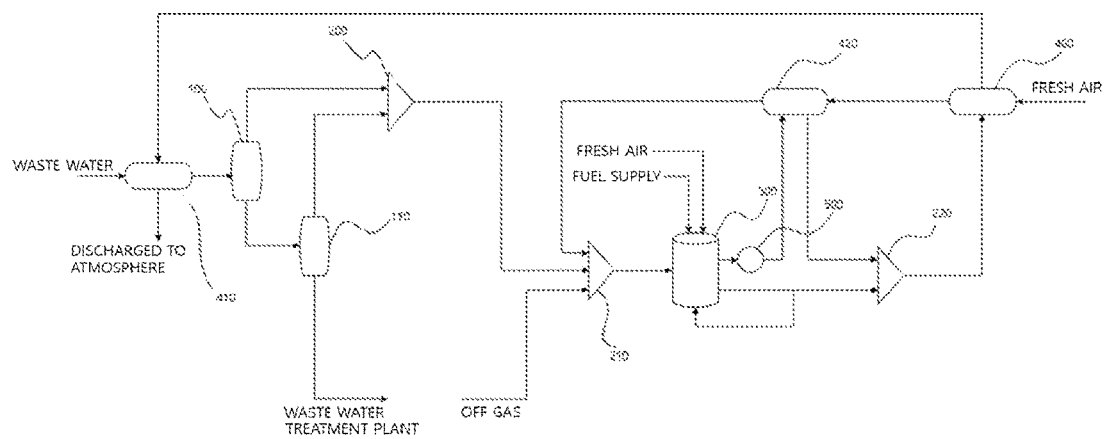

Regarding the process flow diagram shown in FIG. 2, a process was performed in the same manner as in Example 1, except for simulating a process using the Aspen Plus Simulator of Aspen Technology, Inc.

Comparative Example

Figure 3:
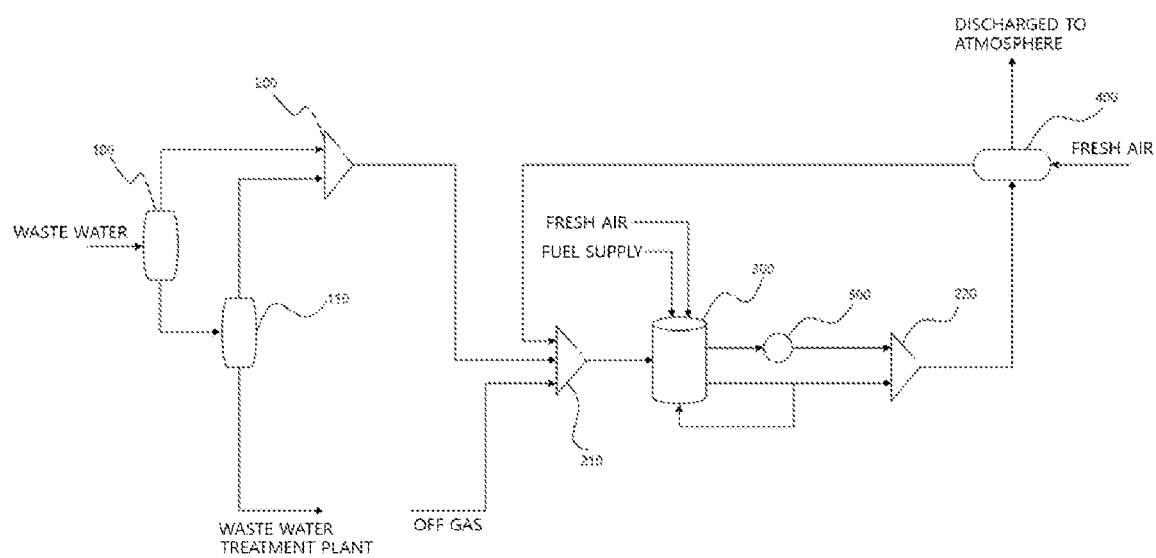
FIG. 3 is a process flow of a waste water incineration method according to a comparative example.

Regarding the process flow diagram shown in FIG. 3, a process was performed in the same manner as in Example 1, except that the process was simulated using the Aspen Plus Simulator of Aspen Technology, Inc. FIG. 3 is a process flow diagram without the second heat exchanger or the third heat exchanger in the waste water incineration process according to the present invention.

Experimental Example

As a result of the process simulation according to Examples 1 and 2 and Comparative Example, temperatures for the respective streams according to the process flows are shown in Table 1 below, and a consumed amount of heat of the first evaporator 100 is shown in Table 2 below.

TABLE 1

| Stream | Temperature (° C.) | | |
|---|---|---|---|
| | Example 1 | Example 2 | Comparative Example |
| Waste water | 30.0 | 30.0 | 30.0 |
| Stream supplied from second heat exchanger to first evaporator | 100.0 | 64.2 | — |
| Top discharge stream of first evaporator | 102.0 | 102.0 | 102.0 |
| Bottom discharge stream of first evaporator | 102.0 | 102.0 | 102.0 |
| Top discharge stream of second evaporator | 105.4 | 105.4 | 105.4 |
| Bottom discharge stream of second evaporator | 105.4 | 105.4 | 105.4 |
| Discharge stream of first mixer | 120.0 | 120.0 | 120.0 |
| Off gas supply stream from waste water treatment plant | 90.0 | 90.0 | 90.0 |
| Stream supplied from first heat exchanger to second mixer | 193.2 | — | 193.2 |
| Stream supplied from first heat exchanger to third heat exchanger | — | 208.5 | — |
| Stream supplied from third heat exchanger to second mixer | — | 287.6 | — |
| Stream supplied to incinerator | 171.7 | 240.3 | 171.7 |
| Stream supplied from incinerator to steam generator | 903.0 | 900.9 | 903.0 |
| Stream supplied from steam generator to third mixer | 450.0 | — | 450.0 |
| Stream supplied from steam generator to third heat exchanger | — | 450.0 | — |
| Stream supplied from third heat exchanger to third mixer | — | 292.6 | — |
| Stream supplied from incinerator to third mixer | 180.0 | 180.0 | 180.0 |
| Stream supplied from third mixer to first heat exchanger | 273.4 | 218.5 | 273.4 |
| Stream supplied from first heat exchanger to second heat exchanger | 155.0 | 87.3 | — |
| Fresh air stream supplied to first heat exchanger | 20.0 | 20.0 | 20.0 |
| Stream discharged from first heat exchanger to atmosphere | — | — | 155.0 |
| Stream discharged from second heat exchanger to atmosphere | 105.0 | 69.2 | — |

TABLE 2

| | Example 1 | Example 2 | Comparative Example |
|---|---|---|---|
| Consumed amount of heat of first evaporator (Gcal/hr.) | 4.101 | 4.694 | 5.023 |

First, referring to Table 1 above, comparing the waste water incineration process flow according to Examples 1 and 2 with the waste water incineration process flow according to Comparative Example, it can be seen that, by installing the second heat exchanger 410 and the third heat exchanger 420, there is a significant difference between the temperature of the stream discharged to the atmosphere and the temperature of the stream supplied to the first evaporator 100.

Specifically, by installing the second heat exchanger 410, in the waste water incineration process of Examples 1 and 2, the mixed discharge stream heat-exchanged in the first heat exchanger 400 is not directly discharged to the atmosphere but is supplied to the second heat exchanger 410 so as to be heat-exchanged again with the waste water and then discharged to the atmosphere. Meanwhile, in the case of the waste water incineration process of Comparative Example without the second heat exchanger 410, the mixed discharge stream heat-exchanged in the first heat exchanger 400 is directly discharged to the atmosphere. Accordingly, it can be seen that the temperatures of the streams discharged to the atmosphere in the waste water incineration processes of Examples 1 to 2 and Comparative Example are 105.0° C., 69.2° C., and 155.0° C., respectively, and thus, the temperatures of the streams of Examples 1 and 2 are significantly lower than that of the stream discharged to the atmosphere of Comparative Example. In particular, in Example 2 in which the third heat exchanger 420 is installed in addition to the second heat exchanger 410, it can be seen that the temperature of the stream discharged to the atmosphere is even lower because heat is more efficiently reused in the process. As a result, in Examples 1 and 2, it can be seen that, by installing the second heat exchanger 410 and the third heat exchanger 420, the amount of heat required for heating the waste water in the evaporator may be saved by preheating the waste water by recycling heat corresponding to 50° C. to 85.8° C.

In addition, the waste water is supplied to the first evaporator 100. In the waste water incineration process of Examples 1 and 2, the waste water is preheated in the second heat exchanger 410 and then supplied to the first evaporator 100. In contrast, in Comparative Example in which the second heat exchanger 410 is not provided, the waste water is directly supplied to the first evaporator 100. Specifically, in Comparative Example, the waste water at 30.0° C. is directly supplied to the first evaporator 100, but in Examples 1 and 2, the waste water is heat-exchanged with the mixed discharge stream, which has passed through the first heat exchanger 400, in the second heat exchanger 410 and then supplied to the first evaporator 100. Here, it can be seen that temperatures of the waste water heat-exchanged in the second heat exchanger 410 of Example 1 and Example 2 are 100.0° C. and 64.2° C., respectively, which are significantly high as compared with Comparative Example.

In addition, in Example 2 in which the third heat exchanger 420 is installed, the fresh air stream is heat-exchanged with the stream supplied from the third mixer 220 in the first heat exchanger 400, and the fresh air stream heat-exchanged in the first heat exchanger 400 is heat-exchanged again with the first incinerator discharge stream in the third heat exchanger 420. The fresh air stream obtaining heat, while passing through the first heat exchanger 400 and the third heat exchanger 420, is supplied again to the incinerator 300. In this case, a temperature of the fresh air stream is 240.3° C., which is significantly different from 171.7° C. of Comparative Example, and it can be seen that heat required for incinerating the waste water in the incinerator 300 may be saved by the temperature difference.

In addition, an energy saving effect according to the installation of the second heat exchanger 410 and the third heat exchanger 420 may also be confirmed through Table 2 above. Referring to Table 2 above, in the case of Example 1 and Example 2, the amounts of heat used in the first evaporator 100 are 4.101 Gcal/hr. and 4.694 Gcal/hr., respectively, and it can be seen that energy was saved by about 0.329 Gcal/hr. to 0.922 Gcal/hr., as compared with the amount of heat of 5.023 Gcal/hr. used in the first evaporator 100 of Comparative Example.

The invention claimed is:

1. A waste water incineration method comprising:
   (S10) supplying waste water to an evaporator to evaporate the waste water;
   (S20) supplying an evaporator top discharge stream discharged from the evaporator to an incinerator to incinerate the evaporator top discharge stream;
   (S30) mixing a first incinerator discharge stream discharged from the incinerator and a second incinerator discharge stream discharged from the incinerator to form a mixed discharge stream; and
   (S40) heat-exchanging the mixed discharge stream and a fresh air stream in a first heat exchanger,
   wherein the mixed discharge stream which has passed through the first heat exchanger is heat-exchanged in a second heat exchanger and then discharged to the atmosphere, and
   wherein a temperature of the first incinerator discharge stream is higher than a temperature of the second incinerator discharge stream.

2. The waste water incineration method of claim 1, wherein the waste water is heat-exchanged with the mixed discharge stream which has passed through the first heat exchanger in the second heat exchanger.

3. The waste water incineration method of claim 2, wherein the waste water heat-exchanged in the second heat exchanger is supplied to the evaporator.

4. The waste water incineration method of claim 2, wherein a temperature of the waste water which has passed through the second heat exchanger is higher than a temperature of waste water before passing through the second heat exchanger.

5. The waste water incineration method of claim 2, wherein a temperature of the waste water passing through the second heat exchanger is 50° C. to 130° C.

6. The waste water incineration method of claim 1, wherein the first incinerator discharge stream passes through a third heat exchanger, and then is mixed with the second incinerator discharge stream to form the mixed discharge stream.

7. The waste water incineration method of claim 1, wherein a temperature of the stream discharged to the atmosphere is 125° C. or less.

8. A waste water incineration apparatus comprising:
   an evaporator evaporating waste water and supplying an evaporated top discharge stream to an incinerator;
   the incinerator receiving the top discharge stream supplied from the evaporator and incinerating the top discharge stream to supply a first incinerator discharge stream and a second incinerator discharge stream to a third mixer;
   the third mixer receiving the first incinerator discharge stream and the second incinerator discharge stream supplied from the incinerator and supplying a mixed discharge stream of the first incinerator discharge stream and the second incinerator discharge stream to a first heat exchanger;
   the first heat exchanger heat-exchanging the mixed discharge stream supplied from the third mixer with a supplied fresh air stream; and
   a second heat exchanger heat-exchanging the supplied mixed discharge stream passing through the first heat exchanger and discharging the heat-exchanged mixed discharge stream to the atmosphere,
   wherein a temperature of the first incinerator discharge stream is higher than a temperature of the second incinerator discharge stream.

9. The waste water incineration apparatus of claim 8, wherein the waste water and the mixed discharge stream which has passed through the first heat exchanger are heat-exchanged in the second heat exchanger.

10. The waste water incineration apparatus of claim 8, further comprising:
   a third heat exchanger heat-exchanging the first incinerator discharge stream discharged from the incinerator and supplying the heat-exchanged first incinerator discharge stream to the third mixer.

11. The waste water incineration apparatus of claim 8, wherein
   the incinerator is a regeneration thermal oxidizer (RTO).

\* \* \* \* \*